US012584804B2

(12) United States Patent
Bonanomi et al.

(10) Patent No.: US 12,584,804 B2
(45) Date of Patent: Mar. 24, 2026

(54) ABA TYPE BLOCK CO-POLYMERS FOR TEMPERATURE SENSING AND FLOW METERS

(71) Applicant: CALIFORNIA INSTITUTE OF TECHNOLOGY, Pasadena, CA (US)

(72) Inventors: Luca Bonanomi, Pasadena, CA (US); Vincenzo Costanza, Pasadena, CA (US); Chiara Daraio, Pasadena, CA (US); Zhun Zhou, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 313 days.

(21) Appl. No.: 18/305,991

(22) Filed: Apr. 24, 2023

(65) Prior Publication Data

US 2023/0266181 A1 Aug. 24, 2023

Related U.S. Application Data

(62) Division of application No. 16/404,543, filed on May 6, 2019, now Pat. No. 11,668,613.

(51) Int. Cl.

| | |
|---|---|
| *G01K 17/20* | (2006.01) |
| *B32B 7/027* | (2019.01) |
| *B32B 27/28* | (2006.01) |
| *B32B 27/30* | (2006.01) |
| *C08F 2/42* | (2006.01) |
| *C08F 293/00* | (2006.01) |
| *C08L 33/08* | (2006.01) |
| *C08L 53/00* | (2006.01) |
| *G01N 27/30* | (2006.01) |

(52) U.S. Cl.
CPC ............. *G01K 17/20* (2013.01); *B32B 7/027* (2019.01); *B32B 27/281* (2013.01); *B32B 27/283* (2013.01); *B32B 27/308* (2013.01); *C08F 2/42* (2013.01); *C08F 293/005* (2013.01); *C08L 33/08* (2013.01); *C08L 53/00* (2013.01); *G01N 27/307* (2013.01); *B32B 2250/05* (2013.01); *B32B 2307/206* (2013.01); *B32B 2307/51* (2013.01); *B32B 2457/00* (2013.01); *C08F 2438/03* (2013.01)

(58) Field of Classification Search
CPC .................................. G01P 5/10; G01F 1/684
See application file for complete search history.

(56) References Cited

U.S. PATENT DOCUMENTS

| | | | |
|---|---|---|---|
| 11,668,613 B2 | 6/2023 | Bonanomi et al. | |
| 11,768,218 B2 | 9/2023 | Bonanomi et al. | |
| 2013/0324697 A1* | 12/2013 | Stepanski | B01D 9/0013 |
| | | | 422/134 |
| 2014/0030538 A1* | 1/2014 | Boutillier | C08L 53/00 |
| | | | 524/505 |
| 2020/0035372 A1 | 1/2020 | Mizuno | |

FOREIGN PATENT DOCUMENTS

| | | |
|---|---|---|
| EP | 3274677 B1 | 5/2025 |
| EP | 4567388 A2 | 6/2025 |

OTHER PUBLICATIONS

Notice of Allowance for U.S. Appl. No. 17/676,703, filed Feb. 21, 2022, on behalf of California Institute of Technology, Mailed Date: Jun. 7, 2023, 8 pages.
Restriction Requirement for U.S. Appl. No. 17/676,703, filed Feb. 21, 2022 on behalf of California Institute of Technology, Mail Date: Nov. 17, 2022, 7 pages.
Communication under Rule 71(3) EPC issued for EP Application No. 16715264.4 filed on behalf of California Institute of Technology. Mail Date: Mar. 12, 2024. 9 pages.
1.98(d) statement + List Sep. 11, 2024. 1 page.
"Chelating polymer" IUPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook.
Chelation in IUPAC Compendium of Chemical Terminology, 5th ed. International Union of Pure and Applied Chemistry; 2025. Online version 5.0.0, 2025. https://doi.org/10.1351/goldbook. C01012.
Communication under Rule 71(3) EPC issued for EP Application No. 16715264.4 filed on behalf of California Institute of Technology. Mail Date Sep. 12, 2024. 8 pages.
Duhr, S. & Braun, D. "Why molecules move along a temperature gradient." PNAS. 19678-19682. vol. 103. No. 52. Dec. 2006. (5 pages).
Extended European Search Report issued for European Patent Application No. 25170434.2 filed on Apr. 14, 2025 on behalf of California Institute of Technology. Mail Date: Jul. 17, 2025. 6 pages.
"Temperature Gradient," Wikipedia. Dec. 16, 2018. Accessed Jul. 29, 2025. 3 pages.
"Zeroth law of thermodynamics," Wikipedia. Jan. 11, 2019. Accessed Jul. 29, 2025. 6 pages.

* cited by examiner

*Primary Examiner* — Marc S Zimmer
(74) *Attorney, Agent, or Firm* — Steinfl + Bruno LLP

(57) ABSTRACT

ABA type block copolymers as a new class of temperature sensing polymers with tunable, high temperature coefficient of resistance (TCR). A sensor includes a heater, a thermal insulator between two thermometer layers, the heater generating a thermal gradient within the thermal insulator. The thermometers give an indirect measurement of fluid flow around the sensor, based on their temperature readings. The thermometers are flexible layers including ABA block polymers.

15 Claims, 11 Drawing Sheets

Figure 6:
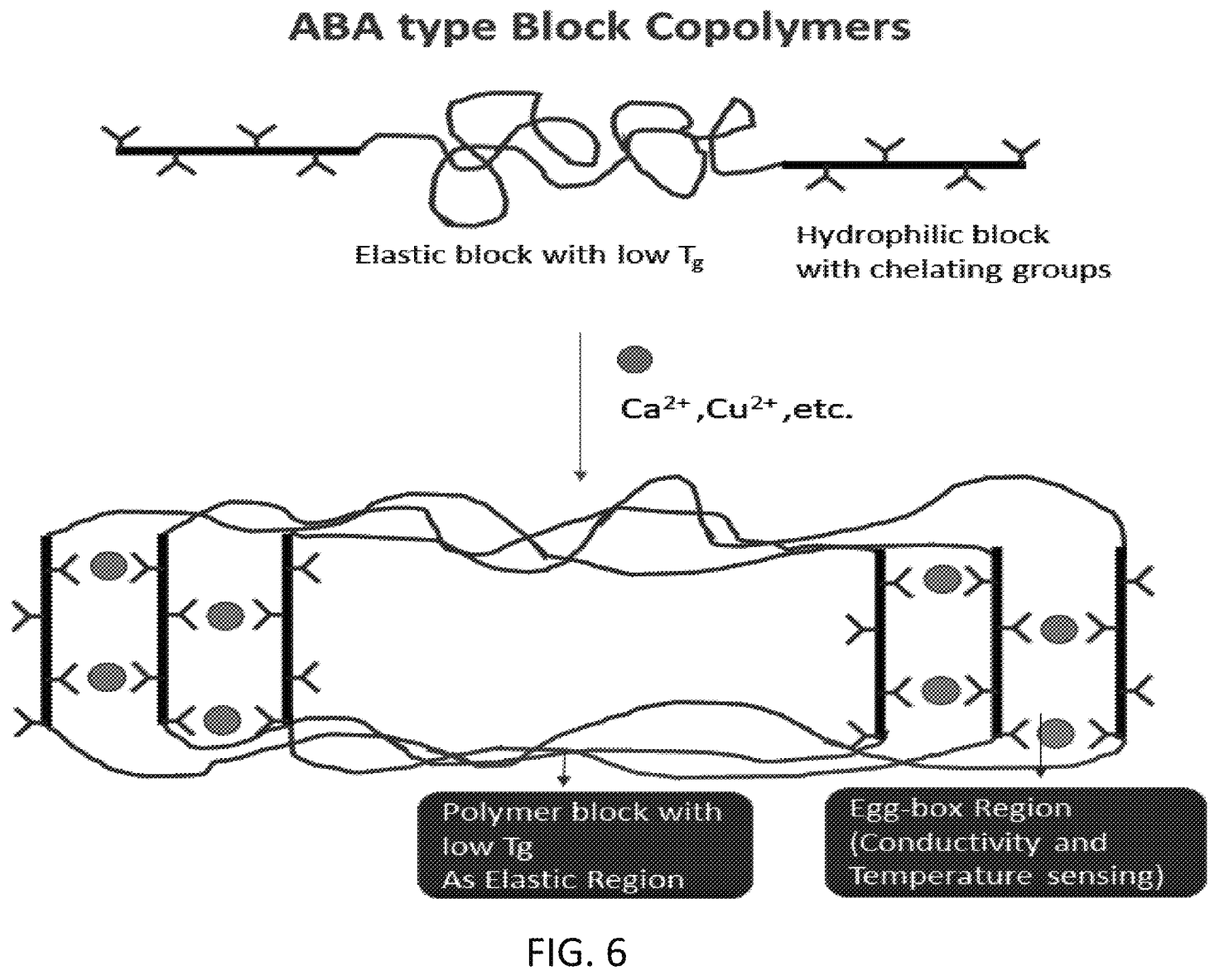

ABA type Block Copolymers

Hydrophilic block
with chelating groups

Elastic block with low $T_g$ $Ca^{2+}, Cu^{2+}$, etc.

Egg-box Region
(Conductivity and
Temperature sensing)

Polymer block with
low Tg
As Elastic Region

ABA TYPE BLOCK CO-POLYMERS FOR TEMPERATURE SENSING AND FLOW METERS

CROSS-REFERENCE TO RELATED APPLICATIONS

The present application is a divisional application of U.S. application Ser. No. 16/404,543 filed on May 6, 2019, which is incorporated herein by reference in its entirety.

TECHNICAL FIELD

The present disclosure relates to temperature sensors. More particularly, it relates to temperature sensing polymers and flow meters.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 6 illustrates the ABA type polymer architecture and polymer motifs design for a temperature sensing elastomer.

FIG. 9 describes the general synthetic procedure for the preparation of ABA block copolymers.

SUMMARY

Figure 1:
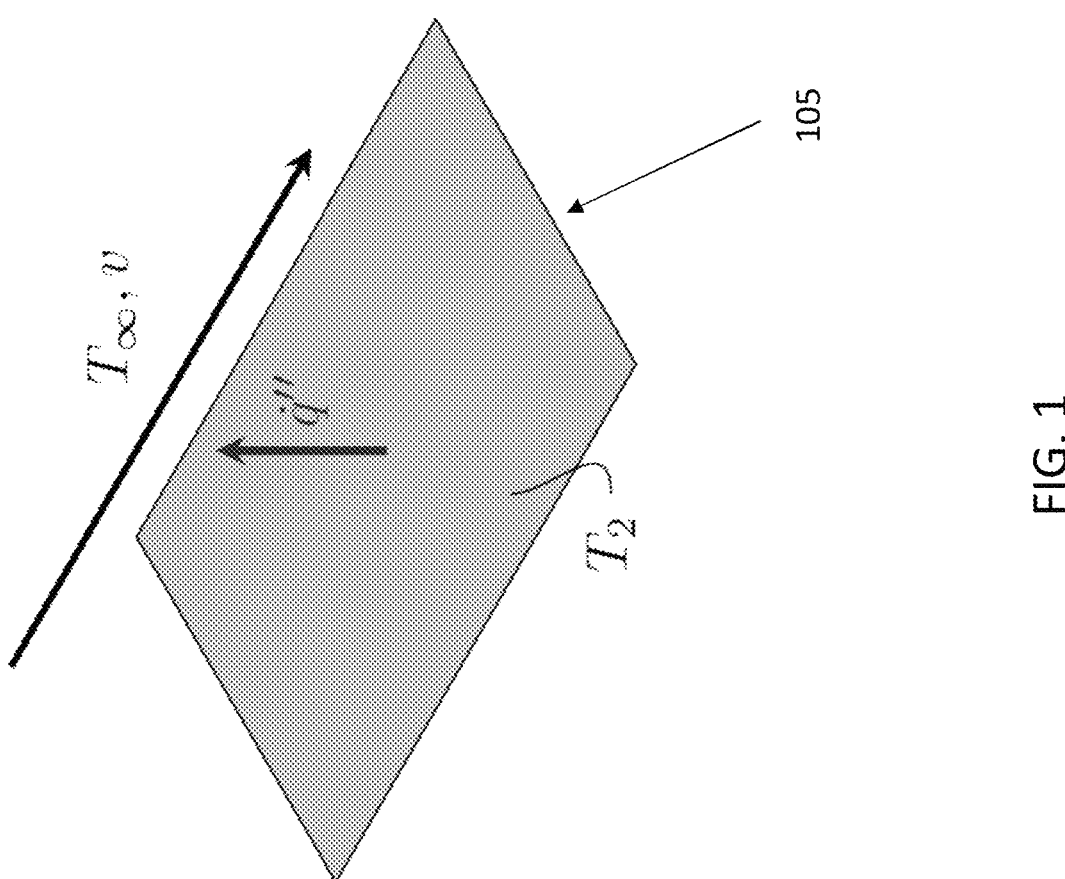
FIG. 1 illustrates convection for a surface.

In a first aspect of the disclosure, a sensor is described, the sensor comprising: at least one heater layer; at least one first thermometer layer; at least one second thermometer layer; and at least one thermal insulator layer between the first thermometer layer and the second thermometer layer, wherein: the at least one first thermometer layer and the at least second thermometer layer each comprise an ABA block polymer, a repeating unit of the ABA block polymer comprises two flanking hydrophilic A polymer blocks comprising chelating motifs capable of binding with divalent or trivalent cations, and a middle B polymer block having a glass transition temperature lower than −50° C., the at least one first thermometer layer is thermally insulated from an environment surrounding the sensor, the at least one second thermometer layer is thermally accessible by the environment, and the at least one heater layer is configured to generate a constant heat flux through the at least one first thermometer layer, the at least one thermal insulator layer, and the at least one second thermometer layer, thus generating a thermal gradient within the at least one thermal insulator.

In a second aspect of the disclosure, a block copolymer structure is described, comprising: a middle B block (n-Butyl Acrylate), having a degree of polymerization in the range 10-1000; and two flanking A blocks comprising a mixture of acrylic acid and 2-hydroxyethyl acrylate, having a degree of polymerization in the range 15-500, and a ratio of acrylic acid to 2-hydroxyethyl acrylate from 0:10 to 10:0.

In a third aspect of the disclosure, a sensor is described, comprising: a substrate; a plurality of bottom electrodes on the substrate; a plurality of top electrodes each intersecting the plurality of bottom electrodes, forming a grid of intersections; a temperature sensing polymer layer between the plurality of bottom electrodes and the plurality of top electrodes; and a sealing layer on the plurality of top electrodes, wherein: the temperature sensing polymer layer comprises an ABA block polymer, and a repeating unit of the ABA block polymer comprises two flanking hydrophilic A polymer blocks comprising chelating motifs capable of binding with divalent or trivalent cations, and a middle B polymer block having a glass transition temperature lower than −50° C.

In a fourth aspect of the disclosure, a method is described, comprising: providing a sensor comprising: at least one heater layer; at least one first thermometer layer comprising the ABA-type block copolymer; at least one second thermometer layer comprising the ABA-type block copolymer; and at least one thermal insulator layer between the first thermometer layer and the second thermometer layer, wherein the at least one first thermometer layer and the at least one second thermometer layer each comprise: an ABA-type block copolymer comprising at least: a middle B block having a glass transition temperature lower than −50° C., and two hydrophilic flanking A blocks, wherein the ABA-type block copolymer comprises metal ions; generating, by the at least one heater, a thermal gradient within the at least one thermal insulator; measuring an electrical current flowing through the at least one first thermometer layer and the at least second thermometer layer; and calculating a fluid velocity based on the electrical current.

DETAILED DESCRIPTION

The present disclosure describes temperature sensing polymers, and flow meters based on polymers, for example for aerodynamics applications. Aerodynamics measurements and wind tunnel experiments are of great importance in engineering: experiments carried out in wind tunnels allow investigation of the complex phenomena developing due to fluid-bodies and fluid-fluid interactions, while also enabling validation of computational fluid dynamics (CFD) code. The main aim of a wind tunnel experiment is often to acquire the pressure and velocity distribution around scaled-down models of structures of interest. Using this data, it is then possible to compute the forces acting on the body subject of the experiment, e.g. the drag force acting on a car, or the lift force generated by a wing.

Measuring techniques typically employed for aerodynamics measurements focus on pressure distributions or fluid velocities. For example, one technique referred to as a pressure tap is based on a Pitot tube used to measure static and dynamic pressure at a single point. Pressure taps and pressure sensitive paints are based on pressure distributions, while laser Doppler velocimetry is based on fluid velocities. Several of these sensors are typically attached to surfaces of interest of models tested in wind tunnels. In post processing, pressure distributions can be approximately reconstructed from the punctual pressure measurements.

Figure 5:
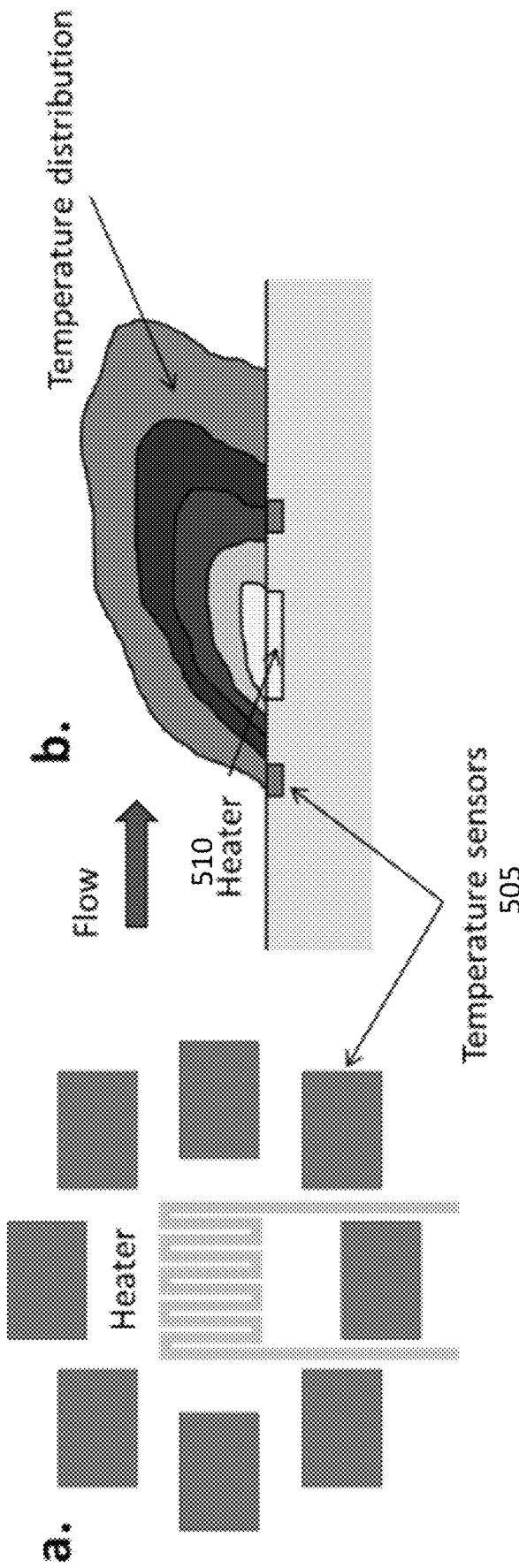
FIG. 5 illustrates a sensor.

Thermal flow meters can measure flow rate even at very low pressure, without affecting the flow. As illustrated in FIG. 5, the sensors combine one or more heating elements (510) and several temperature sensors (505) placed on the surface around the heater (FIG. 5 panel a). Heat is exchanged between the sensor and the fluid flowing at a temperature different from the heating element (FIG. 5, panel b). The flow rate is then determined by measuring the temperature distribution along the sensor created by the flowing fluid. In general, the temperature of the sensor cannot be raised arbitrarily, since high temperatures can be hazardous and can affect the flow. Therefore, the temperature gradient over the sensor is typically not particularly pronounced (the temperature variations are in the order of hundreds of milliKelvin). To achieve acceptable readings from these measurements, especially at low flow densities, commercially available devices are based on MEMS technology and on very accurate temperature sensors. Platinum is one of the most used thermistor, but it has a temperature sensitivity of about $0.4\Omega/^{\circ}$ C. The maximum resistance variation of a thermistor in the considered temperature range for a thermal flow meter is of approximately milliOhms, which requires low-noise read-out electronics to be effectively measured. Furthermore, to optimize the temperature measurements, the thermistors are usually suspended. This requires a complicated fabrication process, which further raise the price for this type of sensors.

Pressure sensitive paints are a special class of paints which can react to pressure changes. These paints are generally composed of a porous polymeric matrix mixed with luminescent organic molecules. When using this technique, models are spray-coated with such paints before being placed in the wind tunnel. The model is illuminated by light of a specific wavelength, causing an electronic excitation in the luminescent molecule. The wavelength is based on the specific luminophore incorporated into the paint. The return to electronic ground state of the luminophore can be attained by either a radiative process, or a radiationless process. In the former case, the relaxation results in photonic emission, while in the latter, interaction with oxygen molecules results in the electron returning to its ground state without photonic emission, a process known as oxygen quenching of luminescence. A pressure sensitive paint is thus, in fact, an oxygen sensor. As the local oxygen (partial) pressure increases, so does the local oxygen concentration, resulting in stronger luminescence quenching. The net effect is a paint whose luminescence decreases as pressure increases. The re-emitted light is finally detected using a camera and, after calibration, the pressure distribution can be computed with virtually unlimited spatial resolution. Notable disadvantages of pressures sensitive paints are the rather long preparation time (deposition and curing time of the paints), and the relatively high velocity range at which they operate (Ma>0.3). Pressure sensitive paints are only suited for use in air flows, as their functioning mechanism relies on the oxygen contained in the gas flow.

Laser Doppler velocimetry is a measuring technique that exploits light scattering due to particles either naturally occurring, or induced, in the flow. Particles moving with the fluid are illuminated with a split laser beam. The shift in frequency between scattered and incident light is proportional to the velocity of the scattering particles, due to the Doppler effect.

The present disclosure describes sensors to perform measurements based on thermal effects, convection in particular. Convection is one of the three heat transfer mechanisms, being the one prevailing in fluids. The convective heat transfer law states that a surface immersed in a moving fluid experiences a heat flux proportional to the temperature difference existing between the surface itself and the fluid, i.e.:

$$\dot{q}''=\alpha\cdot(T-T_{\infty})$$

where: $\dot{q}''$ is the convective heat flux per unit area leaving the surface in $Wm^{-2}$, $\alpha$ is the convective heat transfer coefficient in $WK^{-1}m^{-2}$, T is the temperature of the surface in K, and $T_{\infty}$ is the temperature of the fluid in K. The heat transfer coefficient $\alpha$ is generally very difficult to compute, as it is dependent on many parameters including fluid properties (such as density and specific heat) and problem-specific geometry. In any case, though, a strong dependence of a on the fluid velocity can be observed. In other words, the faster the fluid moves over the surface, the higher the heat transfer coefficient $\alpha$.

This principle is exploited by hot-wire anemometers, i.e. a class of instruments capable of measuring free-stream air velocity (or wind speed, hence the name) based on the aforementioned principle. A hot-wire anemometer is composed of a metallic wire heated significantly above ambient temperature by resistive Joule effect. A feedback loop keeps the wire at a constant temperature by controlling the current through the wire. As the fluid moves around the wire, some of the generated heat is subtracted by convection, thus prompting a response by the feedback loop and an increased current. Since the magnitude of this effect holds a strong dependence on fluid velocity, a calibration procedure allows obtaining the free-stream speed as function of the control effort, that is the electric current in the wire. Hot-wire anemometers are used in free stream conditions, and by construction they offer a very limited spatial resolution. Therefore, their use in wind tunnel experiments is limited to the determination of the free-flowing air speed. A conformal heat-flux sensor, improving on the principle of a hot-wire anemometer with higher spatial resolution and attached on model surfaces in wind tunnel is an advantageous alternative to measure quantities of interest during experiments. The present disclosure describes how to design these conformal heat-flux sensors.

With reference to FIG. 1, a surface (105) at a temperature $T_2$, immersed in a moving fluid, exchanges heat with the fluid at a rate depending on the fluid's temperature $T_{\infty}$, its velocity v, and a problem-specific coefficient $\alpha$, which is strongly dependent on the fluid's velocity v. In FIG. 1, the underlying physical phenomenon is described by the convection heat transfer law.

When the temperatures $T_{\infty}$ and $T_2$ are known, and the heat flux is known, it is possible to invert the convection law to obtain:

$$\alpha = \frac{\dot{q}''}{T_2 - T_{\infty}}$$

Figure 2:
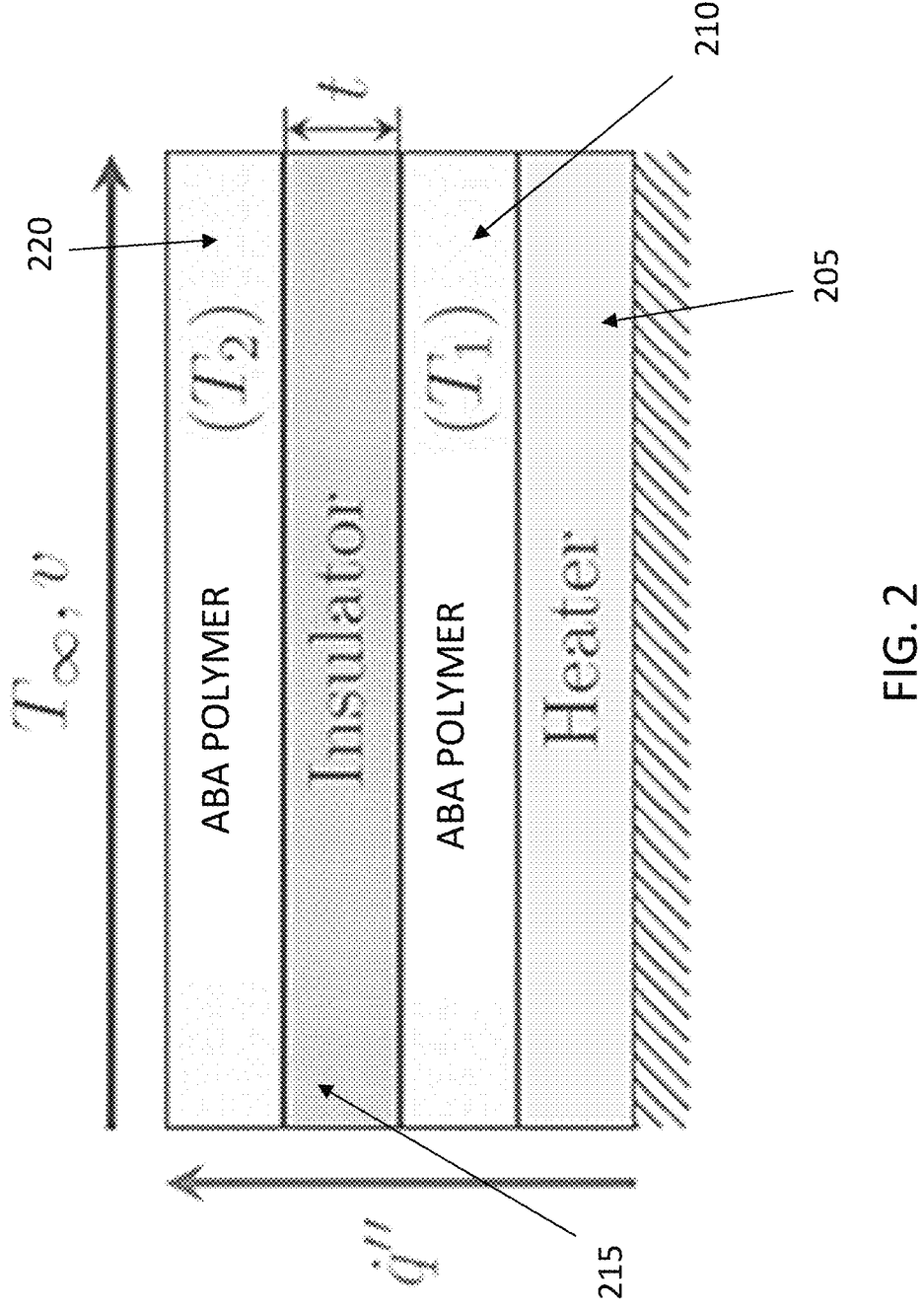
FIG. 2 illustrates an exemplary sensor.

Because of the strong dependence of $\alpha$ on the fluid's velocity, measuring a provides information on the fluid's velocity. The larger $\alpha$ is, the larger the flow speed. In some embodiments, as described in the present disclosure, a sensor can be fabricated based on the physics describing FIG. 1. A sensor, in some embodiments, comprises two thin thermometers separated by a thermal insulator. FIG. 2 illustrates an example of a sensor comprising a heater (205), a first thermometer (210), a thermal insulator (215), and a second thermometer (220).

The thermometers comprise a temperature sensitive material, such as a polymer. One surface of the sensor is insulated, whereas the opposite surface is exposed to the moving fluid, and is thus able to exchange heat therewith. A heater imposes a constant heat flux through the device, building a temperature gradient within the insulator. The temperature gradient is measured using the first and second thermometers, thus allowing the computation of the convective heat-transfer coefficient $\alpha$. The larger the temperature difference between the temperatures of the first and second thermometers, $T_1$ and $T_2$, the larger $\alpha$, and thus the larger the flow speed. The convective coefficient $\alpha$ can be calculated as:

$$\alpha = -\frac{k(T_2 - T_1)}{t(T_2 - T_\infty)}$$

where: k is the thermal conductivity of the insulator; $T_1$, $T_2$ are, respectively, the temperatures of the two thermometers on either side of the insulator; $T_\infty$ is the temperature of the fluid, and t is the thickness of the insulating layer. In some embodiments, a different arrangement or number of layers may be used, based on at least an insulating layer between two thermometers, and a heater. In some embodiments, the sensors can comprise several thermometer layers, and several heating or cooling layers. The sensors can comprise thin electrical heaters, resistive heaters, polyimide foil heaters, an electrical circuit heating by Joule effect, or a Peltier element. The sensor may also comprise a heater or cooling layer that incorporates a microfluidic circuit or channel. One of the thermometer layers is thermally accessible by the environment.

Figure 3:
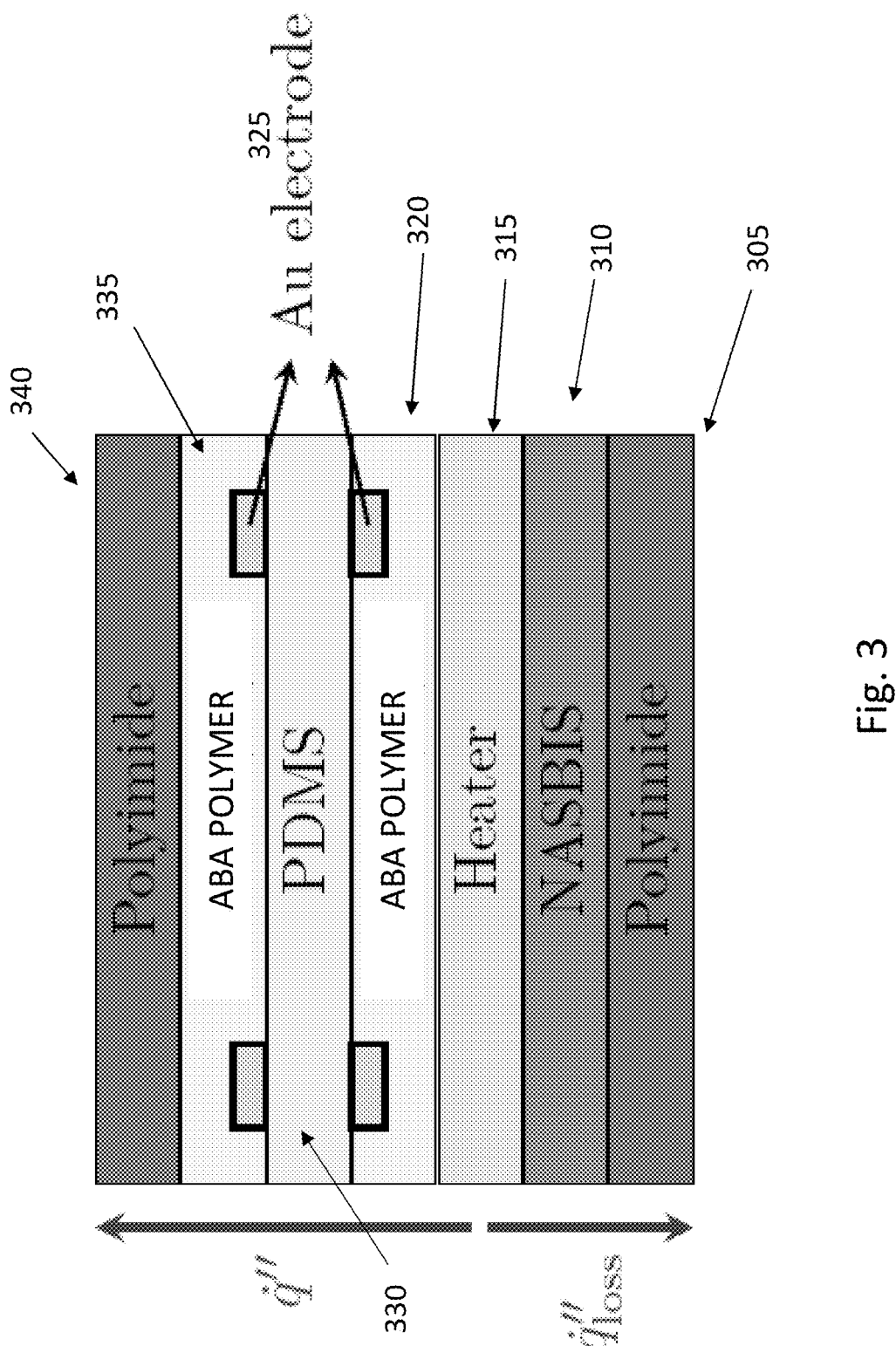
FIG. 3 illustrates an exemplary cross section of a device based on a polymer as a temperature sensitive layer.

FIG. 3 illustrates an exemplary cross section of a device based on a polymer as a temperature sensitive layer (a thermometer). In the embodiment of FIG. 3, the sensor comprises a polyimide layer (305), a thermal insulator layer (310), a heater (315), a thermometer based on a polymer (320), a thermal insulator (330), a thermometer based on a polymer (335), and a polyimide layer (340). In this example, the insulator (310) comprises NASBIS® (NAno Silica Ball InSulator), a flexible, thermally insulating material. In this embodiment, the insulator (330) comprises a polydimethyl-siloxane (PDMS). Gold electrodes (325) can be used for the two polymer thermometers.

Figure 4:
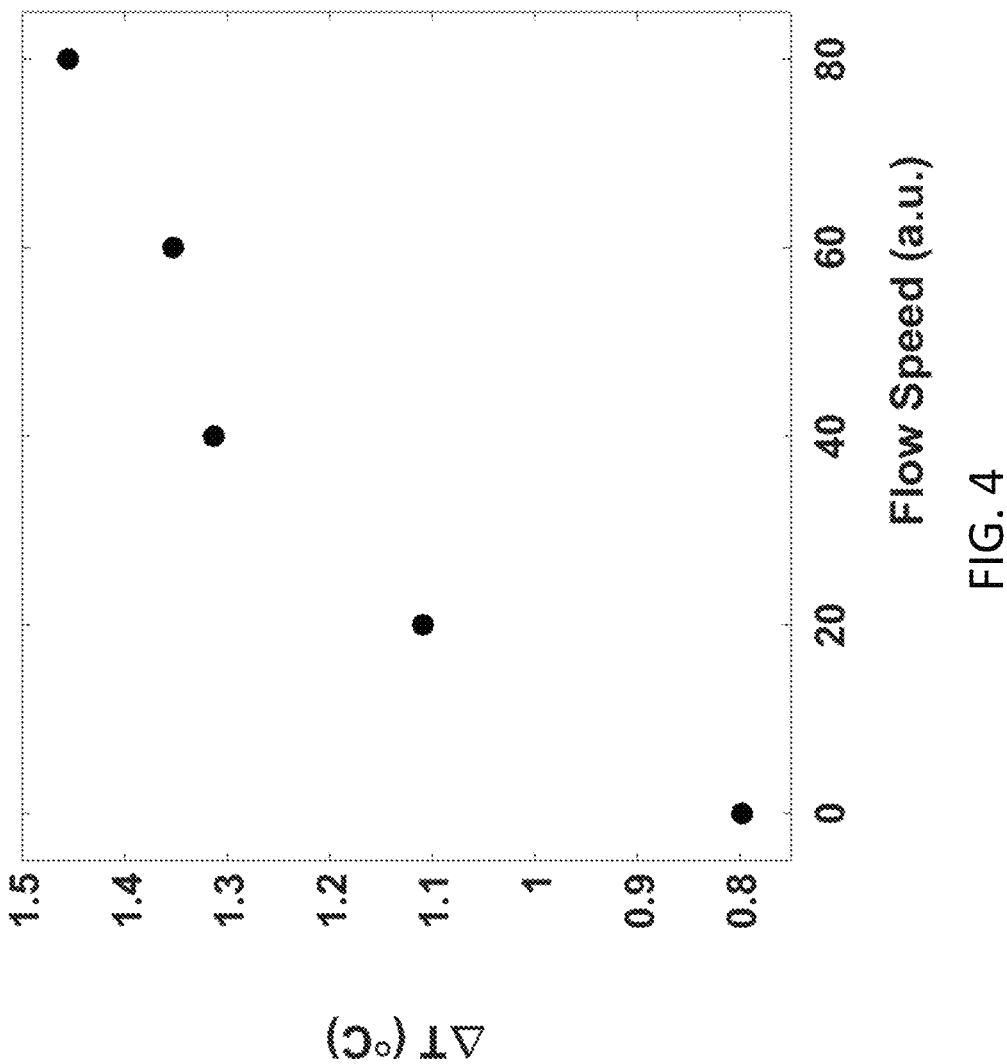
FIG. 4 illustrates exemplary data for the temperature difference between the two thermometers in a sensor.

FIG. 4 illustrates exemplary data for the temperature difference between the two thermometers, which are at temperatures $T_1$ and $T_2$, as a function of the flow speed. A larger difference between $T_1$ and $T_2$ corresponds to a larger flow speed. The device can be calibrated to provide the actual flow speed calculated from the temperature difference. The sensor can be designed as an array of similar pixels to provide a spatial map of the flow's speed. Several sensors can be applied on a model surface to measure the flow speed at different location, thus realizing a conformal sensor array. The sensor can be fabricated from flexible materials, and can therefore be conformally attached to curved surfaces.

As described above, the present disclosure combines a thin heater with a class of organic, temperature-sensitive materials, which show a high resistance versus temperature response. The thin heater serves as a heat source, while the temperature sensitive material, deposited as a thin film or as an array of sensors, provides the temperature feedback. In some embodiments, the sensors of the present disclosure are based on polymers which are very responsive to temperature. Besides possessing an extreme temperature responsivity, these polymers films have a very high signal-to-noise ratio and can sense temperature variation of at least 10 mK. Polymer layers can also be produced on extended areas, and can monitor 2D temperature distributions thanks to their extraordinary responsivity and sensitivity. These advantages allow collecting flow information on extended areas, instead of the localized data provided by standard flow meters.

In some embodiments, the polymer films can be cross-linked by Ca, Cu, or Mg. The present disclosure describes some exemplary materials in the following. These materials can also be used for purposes other than flow sensors. Therefore, the materials in the following are described both for use in flow sensors, and for use unrelated to flow sensors. The present disclosure therefore describes, in some embodiments, a flow meter comprising one or more ABA type block copolymer temperature sensors, and one or more heating (or cooling) elements. For example, a sensor can comprise, as described above, a resistive heater coupled with two local polymer-based temperature sensors.

The present disclosure describes in the following a new class of temperature sensing polymers with tunable, high temperature coefficient of resistance (TCR). The ABA type tri-block copolymers were prepared via two-step reversible addition-fragmentation chain-transfer (RAFT) polymerization, at a large scale, using inexpensive chemicals. When cross-linked with metal ions, the polymers form mechanically robust yet elastic, bi-continuous membranes that demonstrate a huge response to temperature changes, through their change in electrical conductivity. The present disclosure also describes fabrication methods of these materials, as well as an exemplary electrical readout system for these sensors.

As known to the person of ordinary skill in the art, pectin, a component of all higher plant cell walls, is made of structurally and functionally very complex, acid-rich polysaccharides. Pectin is one such material that can be used for fabricating sensors as described in the present disclosure, and plays several roles in plants—for example, it is an essential structural component of cell walls and binds ions and enzymes. In high-ester pectins, at acidic pH, individual pectin chains are linked together by hydrogen bonds and hydrophobic interactions. In contrast, in low-ester pectins, ionic bridges are formed, at near neutral pH, between $Ca^{2+}$ ions and the ionized carboxyl groups of the galacturonic acid, forming an "egg box" in which cations are stored. Since the crosslinking between pectin molecules decreases exponentially with temperature, increasing the temperature of a $Ca^{2+}$-crosslinked pectin increases ionic conduction.

Currently, the potential applications of pectin gels as temperature-sensing elements in mobile phones and automotive applications are challenged by several factors. First, the temperature responsivity and conductivity of hydrogel-based pectin are both highly dependent on the water content of the membrane, whereas the water content is subjected to fluctuations in ambient humidity and temperature. Secondly, being a water-based gel, the applicable temperature range of a pectin gel is limited. The increased evaporation of water at higher temperatures also renders the membrane unstable at higher temperature ranges (>70° C.). Further, due to the intrinsic rigidity of pectin's molecular structure, the flexibility of pectin membranes is dependent on their water content. Excessively reducing the pectin water content results in shrinkage of the pectin membranes, detachment of the membrane from electrodes, and increased brittleness of the membrane. Therefore, while in some applications pectin is can be a good material to fabricate temperature sensors, in other applications its limitations can be overcome by using ABA polymers.

In order to address the above mentioned challenges, the present disclosure describes how to design simpler, synthetic, ABA type polymer backbones that improve the conductivity and temperature responsivity of pectin gels. One approach is to reduce the structure of the more complex pectin polysaccharides to much simpler polymer backbones with minimum required motifs. By combining the "minimum" structural cues of pectin molecules, with ABA type polymer architectures that are widely used to create thermoplastic elastomers, (See Refs. [1-3]) it is possible to create a new class of polymers that are mechanically robust and flexible, while still demonstrating a temperature responsivity that outperforms current state-of-art temperature sensing materials.

In the design of the ABA polymer structure, the A blocks represent two flanking hydrophilic blocks displaying chelating motifs that can bind with divalent or trivalent cations. The middle block B is a polymer block with a low glass transition temperature ($T_g < -50°$ C.), serving as the flexible region, making the membrane elastic and stretchable.

Upon mixing the polymer solution with canonical metal ions, the chelating functional groups in the A block bind with the metal ions, resulting in the clustering of hydrophilic regions into interconnected channels of water and ions, which are responsible for conductivity and responsivity to temperature change. After dehydration, due to differences in hydrophobicity and hydrophilicity, the A blocks and the B blocks segregate separately into bi-continuous membrane, eliciting both the flexibility of the B blocks, and the conductivity, rigidity and temperature sensing properties of the A blocks with bound metal ions. The resulting membrane is mechanically flexible and robust, and demonstrates a large response to temperature changes, through its specific change in electrical conductivity.

The ratio of A blocks to B blocks impacts the conductivity, temperature responsivity, and the mechanical properties of the polymer membrane. These properties can therefore be fine-tuned by changing the ratio of the A blocks to the B blocks.

The overall high hydrophobicity of this new class of polymers results in a simplified process for preparation of polymer-ion cross-linked membranes. The overall high hydrophobicity of this new class of polymers also makes these scaffolds more compatible with other polymer structures, therefore allowing the preparation of multi-layer, multi-functional polymer composites.

FIG. 6 illustrates the ABA type polymer architecture and polymer motifs design for a temperature sensing elastomer.

Figure 7:
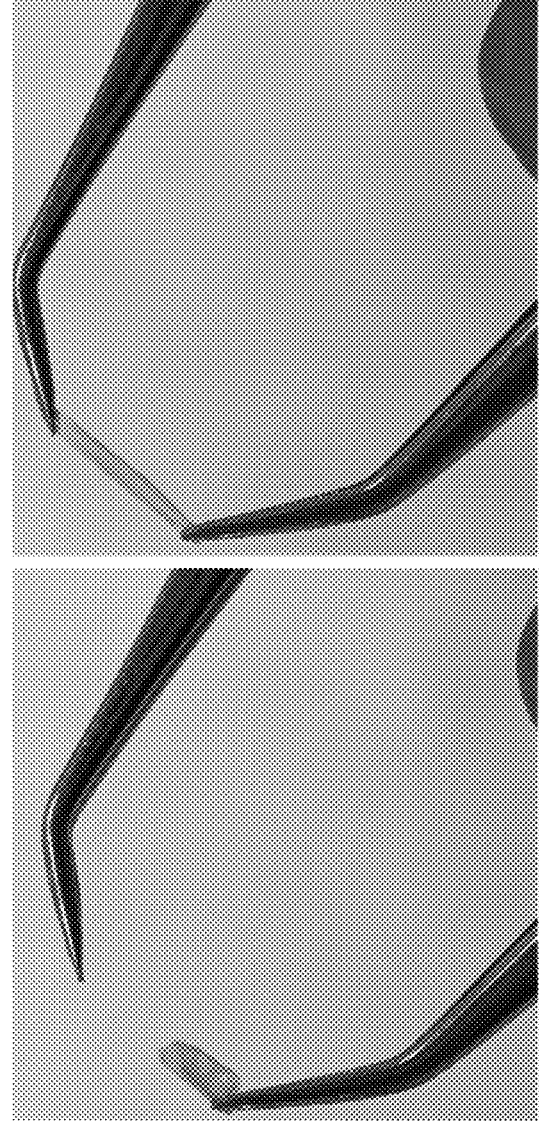
FIG. 7 illustrates how, when cross-linked with $CuCl_2$, the resulting polymer membrane is robust, and elastic.
Figure 8:
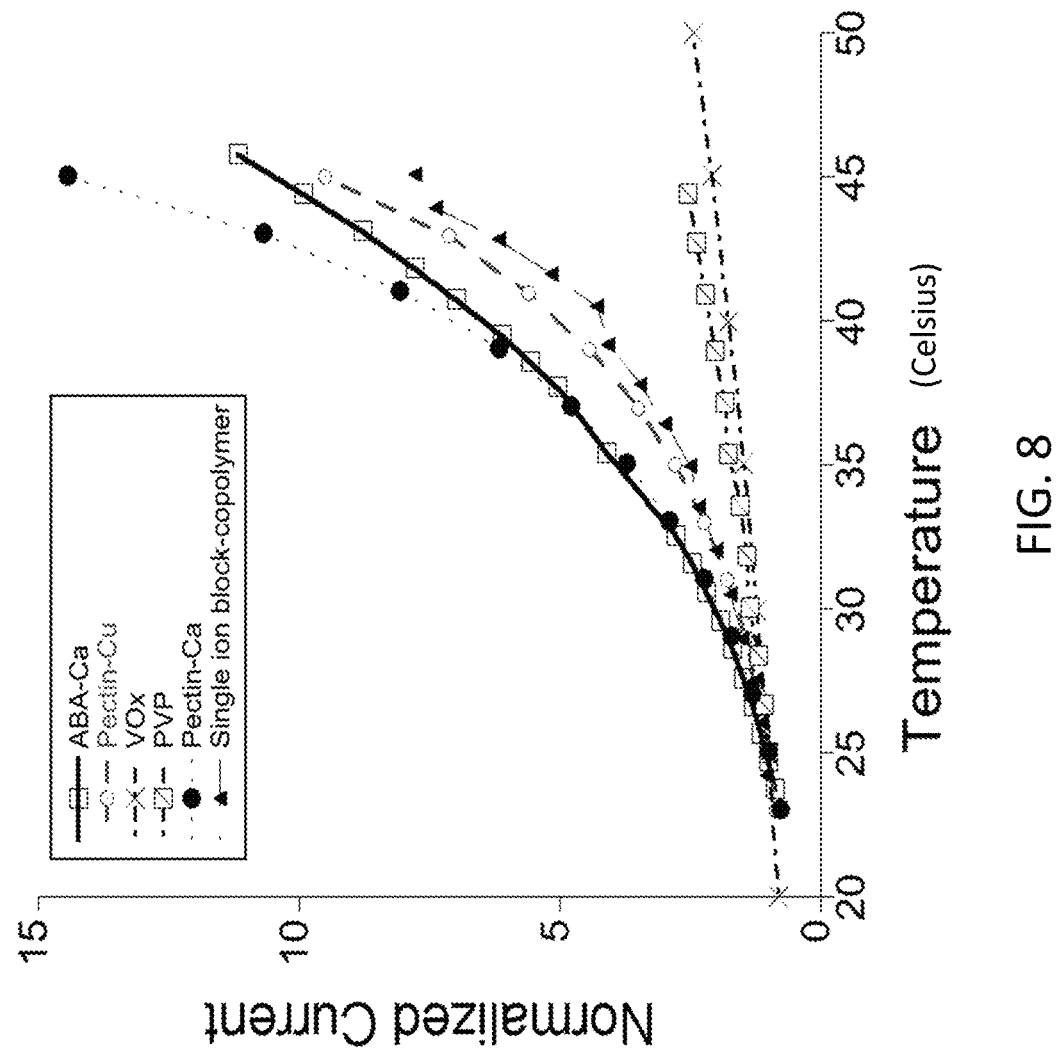
FIG. 8 illustrates a current vs temperature graph.

FIG. 7 illustrates how, when cross-linked with $CuCl_2$, the resulting ABA type polymer membrane is robust, and elastic. FIG. 8 illustrates data for a $Ca^{2+}$ cross-linked membrane demonstrating comparable temperature response with pectin cross-linked with $Cu^{2+}$, $Ca^{2+}$, and a much higher temperature response when compared with vanadium oxide and other generic polymer electrolytes.

Figure 9:
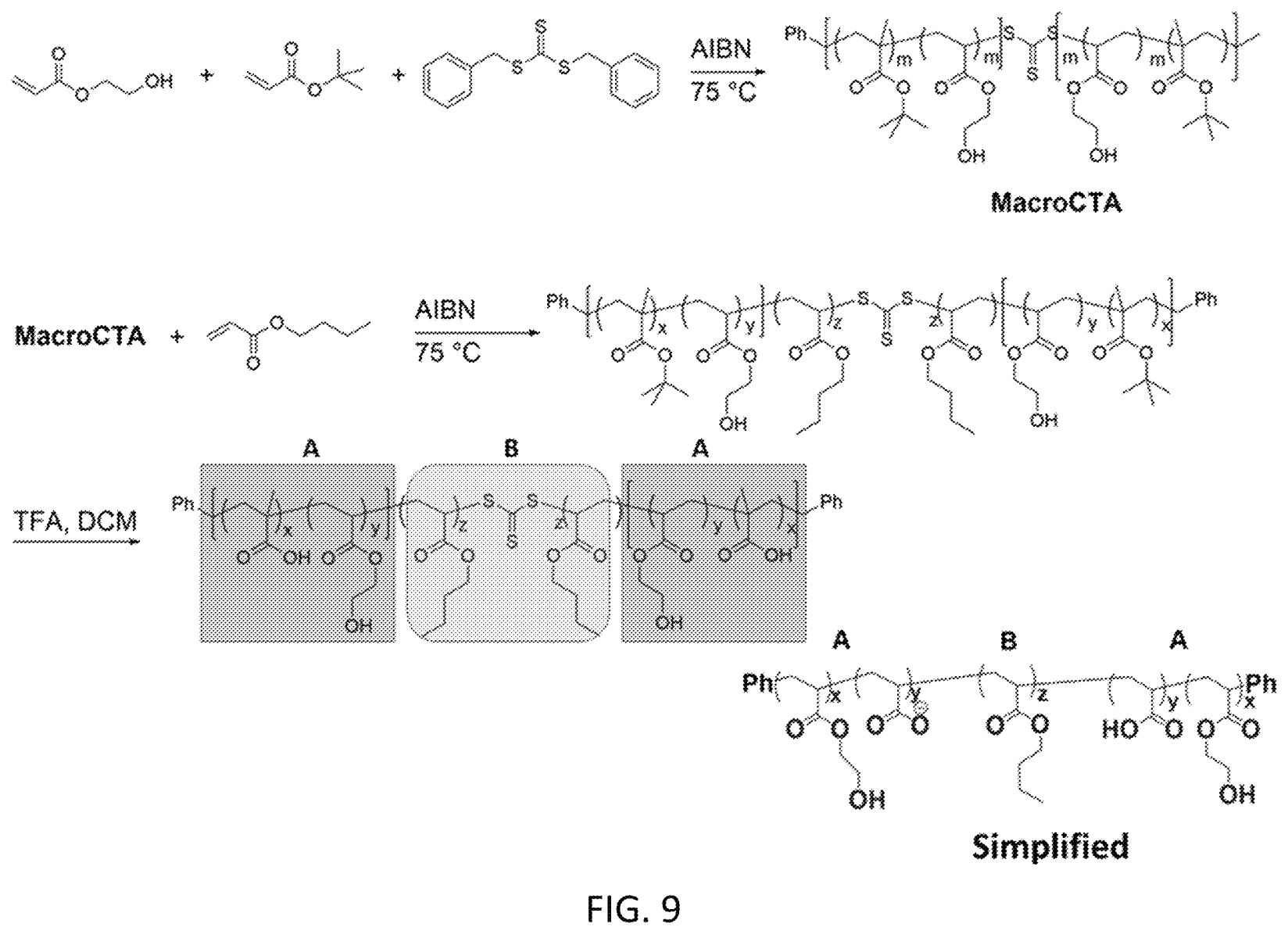
Figure 10:
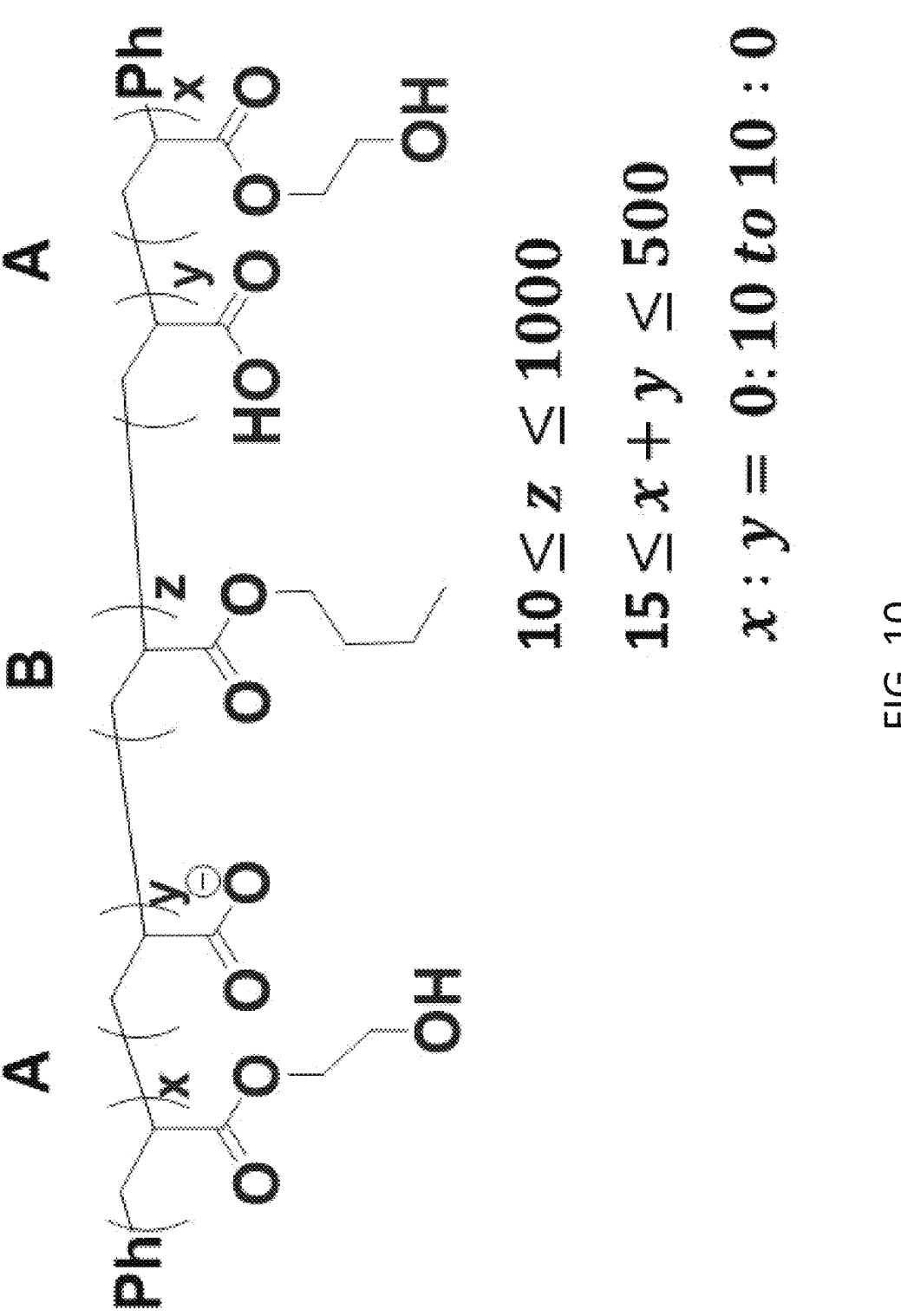
FIG. 10 illustrates the structure of an ABA block polymer.

FIG. 9 describes a general synthetic procedure for the preparation of ABA block copolymers according to the present disclosure. Nitrogen purged 2-hydroxyethyl acrylate and tert-butyl acrylate are mixed at appropriate ratios, followed by the addition of S,S-Dibenzyl trithiocarbonate, a dual-functional chain transfer agent (CTA) used to synthesize multiple block copolymers in reduced steps (see Ref [6]). The mixture was further purged under nitrogen for 5 minutes, added with AIBN (0.1 equivalence to CTA), and then stirred at 75° C., and the progress in polymerization was monitored using $^1$HNMR (see Ref [4]). After 70% conversion, the reaction was vented to air and cooled to room temperature. Residual 2-hydroxyethyl acrylate and tert-butyl acrylate are removed by vacuum, resulting in a sticky gel as the macromolecular chain transfer agent (macro-CTA). The macro-CTA is then mixed with nitrogen purged n-butyl acrylate and AIBN (0.1 equivalence to the macro-CTA), followed by stirring under nitrogen and 75° C. After $^1$-HNMR confirmed conversion of 70%, the reaction was vented to air and cooled to room temperature. Residual n-butyl acrylate is then removed by vacuum. The polymer was then dissolved in a DCM:Trifluoroacetic acid (TFA) solution to remove tert-butyl group. Removing excess DCM and TFA results in the final ABA polymer as a transparent, elastic gel. FIG. 10 illustrates an exemplary ABA polymer according to the present disclosure.

In some embodiments, the ABA block copolymer structure comprises: a middle block (B block) poly (n-Butyl Acrylate), with degree of polymerization in the range 10-1000; two flanking polymer blocks (A blocks) comprising a mixture of acrylic acid and 2-hydroxyethyl acrylate, with degree of polymerization in the range 15-500, with a ratio of acrylic acid to 2-hydroxyethyl acrylate from 0:10 to 10:0. In some embodiments, the middle B block comprises polymer building blocks other than n-butyl acrylate and has a glass transition temperature lower than −50° C. In some embodiments, the flanking A blocks comprise polymer building blocks that are hydrophilic and capable of interacting with metal ions, and are capable of eliciting response to temperature change through its specific change in electrical conductivity.

Figure 11:
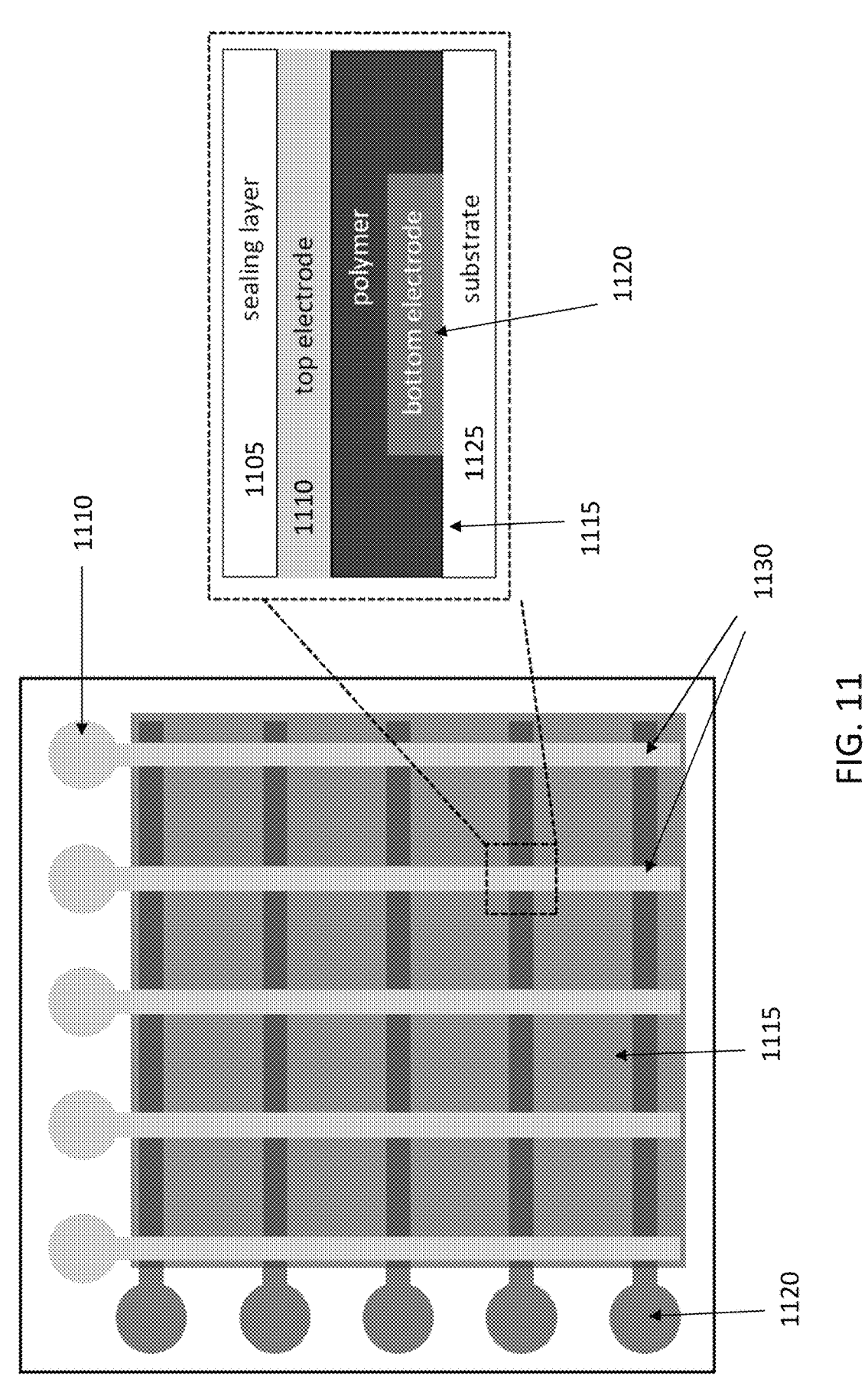
FIG. 11 illustrates an exemplary temperature sensor.

FIG. 11 illustrates an exemplary temperature sensor. In some embodiments, temperature sensors based on the ABA polymers of the present disclosure can be used for applications other than sensing of fluid flow. The ABA polymers can be used to monitor temperature distributions both spatially and temporally over extended areas and surfaces. FIG. 11 illustrates a sensor comprising several layers. The sensor can map surface temperature, as in this example it comprises 5×5 pixels. Each junction (130) at the intersection of the bottom and top layers allows sensing of the temperature at that position. A sensor may comprise different numbers of pixels depending on the application. FIG. 11 also illustrates a zoomed-in area of the sensor. A layer of temperature sensing polymer (1115) is sandwiched between two sets of electrodes: a top electrode (1110), and a bottom electrode (1120). In this configuration, the top electrodes are orthogonal to the bottom ones allowing to measure the temperature at the spots corresponding to an intersection between two electrodes. The electrodes can be read to address each intersection as can be understood by the person of ordinary skill in the art. A sealing layer (1105) can be applied on top, while a substrate (1125) is illustrated on the bottom of the sensor. The sensor may be made of flexible materials. The measurements carried out by the sensor are based on the changes in electrical conductivity of the polymers, which is a function of temperature.

In some embodiments, the connections between A blocks with B block are not only comprised of carbon-carbon bonds, but can also be any other linkage, including but not limited to carbon-sulfur, disulfide, carbon-oxygen bonds etc. In some embodiments, the flanking A blocks are comprised of more than two types of polymer building blocks that are hydrophilic and capable of interacting with metal ions, and are subsequently capable of eliciting response to temperature change through its specific change in electrical conductivity. In some embodiments, the middle B block is comprised of more than one type of polymer building blocks with low glass transition temperature (Tg<−50° C.).

In some embodiments, a method is described comprising providing a class ABA type block copolymers capable of interacting with metal ions, and through this interaction, elicit response to temperature change through its specific change in electrical conductivity; fabricating a metal-ion cross-linked polymer membrane which is mechanically robust, elastic, and displays a huge response to temperature change through its specific change in electrical conductivity, wherein the metal ions can be canonical metal ions, including but not limited to $Cu^{2+}$, $Mg^{2+}$, $Ca^{2+}$, $Fe^{2+}$, $Fe^{2+}$, $Li^{+}$, $Co^{2+}$, etc. In some embodiments, the ABA polymer with metal ions are deposited as a membrane comprising a heater, a thermal insulator and any additional layers as described in the present disclosure, thus fabricating a sensor.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

REFERENCES

[1] Hayashi, M.; Matsushima, S.; Noro, A.; Matsushita, Y. Macromolecules 2015, 48 (2), 421.

[2] Hashimoto, T.; Imaeda, T.; Irie, S.; Urushisaki, M.; Sakaguchi, T. J. Polym. Sci. A Polym. Chem. 2015, 53 (9), 1114.

[3] Varshney, S. K.; Kesani, P.; Agarwal, N.; Zhang, J. X.; Rafailovich, M. Macromolecules 1999, 32 (1), 235.

[4] Hawthorne, D. G.; Moad, G.; Rizzardo, E.; Thang, S. H. Macromolecules 1999, 32 (16), 5457.

[5] Thang, S. H.; Chong, (bill)y K.; Mayadunne, R. T. A.; Moad, G.; Rizzardo, E. Tetrahedron Lett. 1999, 40 (12), 2435.

[6] Kang, H. U.; Yu, Y. C.; Shin, S. J.; Youk, J. H. Journal of Polymer Science Part A: Polymer Chemistry. 2013, pp 774-779.

What is claimed is:

1. A sensor comprising:
at least one heater layer;
at least one first thermometer layer;
at least one second thermometer layer; and
at least one thermal insulator layer between the first thermometer layer and the second thermometer layer, wherein:
the at least one first thermometer layer and the at least second thermometer layer each comprise an ABA block polymer,
a repeating unit of the ABA block polymer comprises two flanking hydrophilic A polymer blocks comprising chelating motifs capable of binding with divalent or trivalent cations, and a middle B polymer block having a glass transition temperature lower than −50° C.,
the at least one first thermometer layer is thermally insulated from an environment surrounding the sensor,
the at least one second thermometer layer is thermally accessible by the environment, and
the at least one heater layer is configured to generate a constant heat flux through the at least one first thermometer layer, the at least one thermal insulator layer, and the at least one second thermometer layer, thus generating a thermal gradient within the at least one thermal insulator.

2. A sensor comprising:
a substrate;
a plurality of bottom electrodes on the substrate;
a plurality of top electrodes each intersecting the plurality of bottom electrodes, forming a) grid of intersections;
a temperature sensing polymer layer between the plurality of bottom electrodes and the plurality of top electrodes; and
a sealing layer on the plurality of top electrodes, wherein:
the temperature sensing polymer layer comprises an ABA block polymer, and
a repeating unit of the ABA block polymer comprises two flanking hydrophilic A polymer blocks comprising chelating motifs capable of binding with divalent or trivalent cations, and a middle B polymer block having a glass transition temperature lower than −50° C.

3. The sensor of claim 2, wherein the grid of intersections comprises 5×5 intersections.

4. The sensor of claim 1, wherein the at least one first thermometer layer is disposed between the at least one second thermometer layer and the at least one heater layer.

5. The sensor of claim 1, wherein the at least one heater layer is selected from the group consisting of: an electrical heater, a resistive heater, a polyimide foil heater, an electrical circuit heating by Joule effect, and a Peltier element.

6. The sensor of claim 1, wherein the at least one thermal insulator is made of polydimethylsiloxane.

7. The sensor of claim 1, wherein the at least one heater layer, the at least one first thermometer layer, the at least one second thermometer layer, and the at least one thermal insulator are flexible layers.

8. The sensor of claim 1, wherein the at least one first thermometer layer and the at least one second thermometer layer each comprise metal ions.

9. The sensor of claim 8, wherein the metal ions are selected from the group consisting of: Cu2+, Mg2+, Ca2+, Fe2+, Fe3+, Li+, and Co2+.

10. The sensor of claim 1, wherein the two flanking hydrophilic A blocks comprise hydrophilic polymer building blocks configured to interact with metal ions and configured to eliciting a response to temperature changes through their change in electrical conductivity.

11. The sensor of claim 1, wherein bonds between the middle polymer B block and the two flanking hydrophilic A blocks are selected from the group consisting of: carbon-carbon bonds, carbon-sulfur bonds, disulfide bonds, carbon oxygen bonds, and any combination thereof.

12. The sensor of claim 1, wherein the middle B polymer block comprises more than one type of monomer.

13. The sensor of claim 1, wherein the two flanking hydrophilic A blocks comprise more than one type of monomer.

14. The sensor of claim 1, wherein the middle B polymer block comprises a linking group.

15. The sensor of claim 14, wherein the two flanking hydrophilic A polymer blocks are symmetrically linked to the middle B polymer block.

* * * * *